Dec. 16, 1924.

J. B. PAGE

PASTRY CONTAINER

Filed Nov. 20, 1923

1,519,874

Inventor

John B. Page

By Frease and Bond

Attorneys

Patented Dec. 16, 1924.

1,519,874

UNITED STATES PATENT OFFICE.

JOHN B. PAGE, OF CANTON, OHIO.

PASTRY CONTAINER.

Application filed November 20, 1923. Serial No. 675,847.

*To all whom it may concern:*

Be it known that I, JOHN B. PAGE, a citizen of the United States, residing at Canton, in the county of Stark and State of Ohio, have invented certain new and useful Improvements in Pastry Containers, of which the following is a specification.

This invention relates to containers for carrying cakes, pies, and the like, and the objects of the improvement are to provide a sectional container comprising a base plate and a plurality of superposed covers, the lower cover fitting upon the base plate and covering the pastry placed thereon, the top of each of the other covers being adapted to receive pastries which are covered by the next higher cover, a handle device being provided for carrying the container and locking the several sections together.

The above and other objects may be attained by constructing the container in the manner illustrated in the accompanying drawing, in which—

Figure 1:
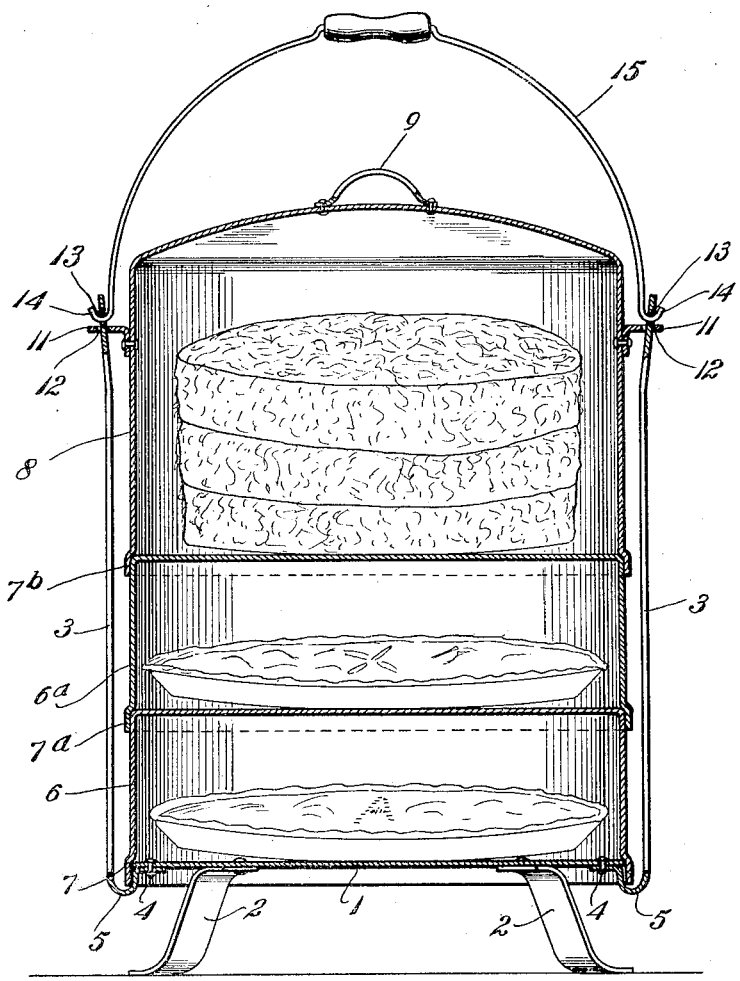
Figure 2:
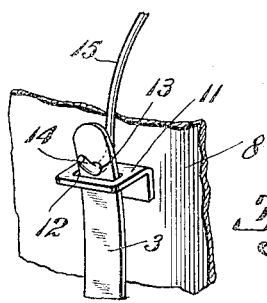

Figure 1 is a vertical sectional view through a container embodying the invention; and Fig. 2, a detail perspective view of the handle attachment.

Similar numerals refer to similar parts throughout the drawing.

The device comprises a flat bottom plate 1, which is preferably circular and supported upon the feet 2. Two vertical strips 3 are connected at their lower ends as at 4 to diametrically opposite sides of the bottom plate, being preferably provided with the downwardly curved portions 5 adjacent to the edges of the plate to receive the lower cover 6.

This cover is preferably of cylindrical form and of sufficient height to accommodate a pie or the like, which may be placed upon the bottom plate 1. The lower edge of the cover 6 is provided with the annular rim 7 adapted to fit snugly around the edge of the bottom plate 1 and to be received into the U-shaped portions 5 of the vertical strips 3.

The next higher cover 6ª may be of the same construction as the cover 6, being provided with an annular rim 7ª at its lower edge to fit around the upper edge of the cover 6. This cover may also be of the same height as the cover 6 to accommodate a pie or the like.

The upper cover 8 is preferably of considerably greater height to accommodate a cake of several layers or the like, and it is also provided with an annular rim 7ᵇ which fits snugly around the upper edge of the cover 6ª.

A hand grip 9 may be provided upon the top of the upper cover 8 to facilitate the removal of the same when access to the contents is desired, and a pair of diametrically opposite ears 11 are attached to the sides of the cover 8 and provided with slots 12 through which the upper portions of the strips 3 protrude.

Apertures 13 are formed in the upper end portions of the strips 3 to receive the hooked ends 14 of the handle bail 15, which provides a convenient means for carrying the container and also locks the several sections together.

It is understood that sectional containers have been provided in which each section comprises a receptacle open at its upper end, the bottom of the next upper section forming a closure therefor, and such containers are not practical for the purpose of carrying pastries, pies, cakes and the like, as it is necessary for the user to reach down into the receptacle to remove the contents, which is often broken or destroyed in the removal therefrom.

With the present construction, each cover may be removed, leaving the contents of that particular section entirely exposed upon the top of the next lower section, and the cake or pie or the like may be cut and served directly thereon.

I claim:—

1. A pastry container including a base plate and a plurality of hollow cover members, the lower open end of each member fitting upon the top of the next member, vertical strips connected to the base plate and provided with apertures in their upper end portions, slotted ears upon the top and cover member receiving the upper ends of said strips, and a handle bail provided with hooked end portions for engagement with the apertures in said strips above said ears.

2. A pastry container including a base plate and a plurality of hollow cover members, the lower open end of each member fitting upon the top of the next lower member, vertical strips connected to the base plate, slotted ears upon the top cover member receiving the upper ends of said strips, and a handle bail connected to said strips above said ears.

In testimony that I claim the above, I have hereunto subscribed my name.

JOHN B. PAGE.